Feb. 15, 1938.   J. G. SJOBERG   2,108,183
DREDGE PIPE Y VALVE
Filed Jan. 9, 1937
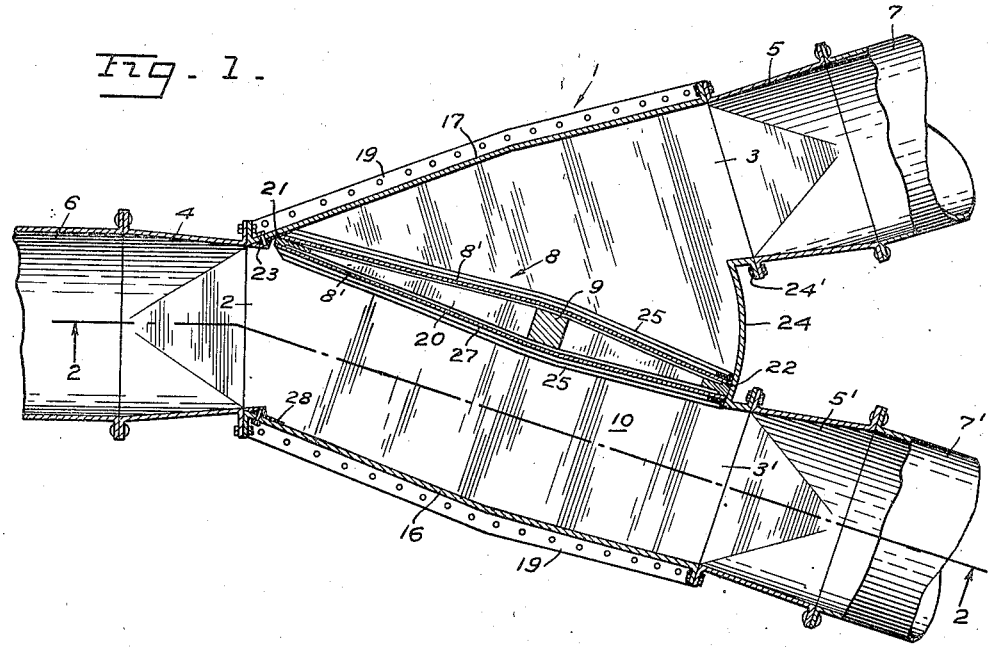
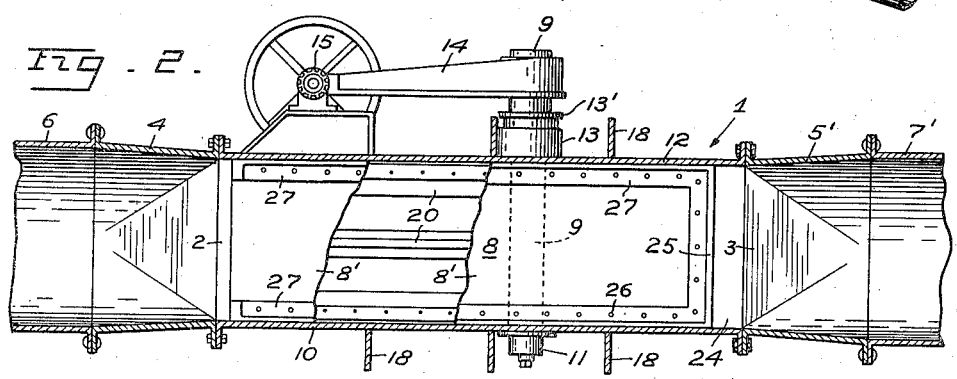
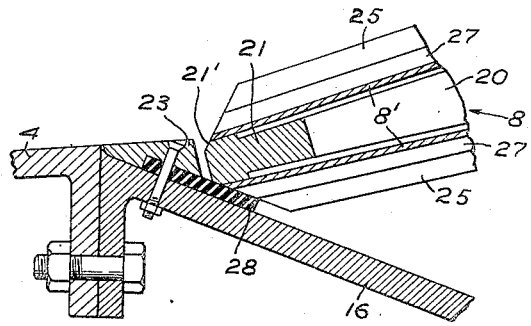
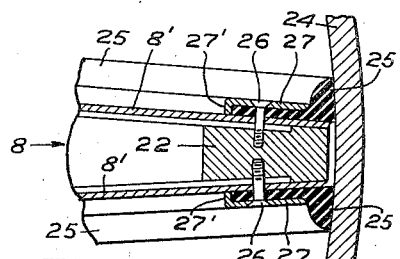
INVENTOR.
JOHN G. SJOBERG
BY *Miller Bayken & Bried*
ATTORNEY.

Patented Feb. 15, 1938

2,108,183

UNITED STATES PATENT OFFICE 2,108,183

DREDGE PIPE Y VALVE

John G. Sjoberg, Oakland, Calif., assignor to Pacific Coast Engineering Company, Inc., Oakland, Calif., a corporation of California Application January 9, 1937, Serial No. 119,827

8 Claims. (Cl. 251—13)

This invention relates to suction dredge pipe lines and in particular to special construction in a Y-valve for such lines to divert the flow of mud from one branch discharge pipe line to another.

The principal object of the invention is to provide improved construction in such a valve whereby it will withstand the great pressures and friction to which such a valve must be subjected, yet be operable with reasonable expenditure of power during the outward flow of the mixture of mud and stones.

Another object is to provide improved construction in the body of the gate of this type of valve.

Still another feature is the provision of special means for sealing the gate against the pressures involved. Other objects and advantages of the construction will appear in the following description and accompanying drawing.

In the drawing,

Fig. 1 is a horizontal sectional view of the valve and its gate, and showing portions of the pipe line connections at the inlet and two outlets of the valve.

Fig. 2 is a side elevation of the valve with parts broken away to show the inner construction.

Fig. 3 is an enlarged view showing in horizontal section a portion or nose of the valve gate in sealing relation to one of the side walls of the valve.

Fig. 4 is an enlarged view similar to that of Fig. 3 but showing the foot or heel of the gate and its sealing gaskets.

Generally, the parts shown in the drawing are the flat-sided valve body or casing 1, with inlet at 2, and two outlets 3 and 3', the inlet and the outlets being fitted with adapter sections 4, 5 and 5' which change from flat to round form to connect with dredge pipes 6, 7 and 7', all connections being of the bolted flange type as indicated. Within the casing is a vertically extending gate 8 secured to a vertical operating shaft 9 which projects through the bottom wall 10 of the casing into a bearing 11 closed at its lower end, and through the top wall 12 and a sealing bearing 13 above which it is connected to an operating lever 14 taking the form of a quadrant or gear segment meshing with a power or hand-operated worm 15 suitably mounted on the casing.

In more detail the casing walls 10, 12, 16 and 17 are preferably of heavy steel plates suitably braced as indicated at 18, the connections between all structural units and pipe connections are by means of outwardly extending flange joints as at 19 suitably bolted or riveted, as indicated. The upper plate or top wall 12 is bolted at its margins to the adjacent connecting parts so that it may be removed for insertion of the valve gate 8 or renewal of its side plates.

The valve gate structure comprises a steel skeleton interior frame 20 welded together as a unit (though it may be a steel casting) and to which the shaft is permanently secured as by welding, or if the gate frame is cast it may be cast around the shaft. The shaft is preferably of rectangular cross section or otherwise arranged to resist turning where it is embraced by the gate frame 20 and the frame is arched or tapered from the shaft both toward its nose 21 and heel 22 and is recessed on opposite sides to receive a pair of slightly arched heavy steel side plates 8' which are removably bolted to it so that they can be replaced as they become badly worn from the passing mud and stones.

The shaft is, of course, of round section where it passes into the bearings, and the upper bearing 13 is suitably recessed for packing material and provided with a suitable bolting gland 13'.

It will be noted from Fig. 1 that the axis of vertical shaft 9 is somewhat closer to the heel end 22 of the valve gate than to the nose 21 of the gate, and that when the gate is swung to its limit of travel in either direction, that its nose falls within a recess or shoulder 23 formed at the forward margins of the casing side walls 16, 17 so as to effectually protect the forward edge or nose of the gate from being struck by the flow of material and maintain a smooth, unobstructed passageway in either position of the gate.

The rear vertical edge of the gate or heel 22 moves along an arcuate path adjacent a curved wall 24 preferably formed by a steel casting outwardly and return flanged as at 24', fitted in between the top and bottom casing walls and bolted both to these walls and to the pipe adapter members 5 and 5'. The internally curved wall 24 is preferably machined and is sealed against leakage by L-shaped rubber gasket strips 25 which are clamped to opposite sides of the gate as by means of bolts 26 interposed between which and the rubber strips are steel protection plates 27 which have flange portions 27' extending over the inner edges of the gasket strips so that they are protected against wear except at the outwardly turned portions 25 which are exposed to the pressure of the liquid mass flowing through the valve to thus effect a tight seal against the curved wall 24.

The double gasket strip arrangement described for the rear edge or heel of the valve gate extends also along both the top and bottom edges to seal against the upper and lower walls of the casing, and it may also extend along the forward edge if shoulder 23 is made deep enough to protect it. However, I prefer a modified sealing arrangement for the nose of the gate as shown best in Fig. 3 and wherein a thick slab of soft rubber 28 is clamped by its forward edge to the side wall 16 of the casing as by means of overlying shoulder strips 23 which are bolted in place. The nose of the gate frame is beveled off slightly on both sides as at 21' so as to fit nicely against the soft rubber slab, and owing to the gate shaft 9 being closer to the heel of the gate the forward end is exposed to somewhat greater pressure from the flowing mass passing through the valve and thus automatically held tightly against the soft rubber slab 28, although the worm and segment gate operating mechanism being self-locking of itself tends to prevent any opening of the gate.

From the above description the operation of the valve will be clear without further explanation, and while I fully realize that many Y-valve constructions have been made before, I feel that for heavy work in large suction dredge pipe lines, my special construction and combination as above set out are much superior and better adapted for such work than anything heretofore available.

I therefore claim:

1. A dredge pipe line Y valve comprising a casing of rectangular cross section having an inlet opening at its forward end and two spaced outlet openings at its rearward end, a gate fitting within said casing pivotally mounted on a vertical shaft intermediate the forward and rearward edges of the gate to swing the forward edge of the gate across said inlet opening against either side wall of the casing and the rearward edge of the gate from one to the other adjacent edges of the spaced outlet openings, a curved wall extending between said outlet openings against which the rearward end of the gate seals, said gate being of tapering thickness thicker at the position of the shaft and provided with a frame integrally secured to the shaft.

2. A dredge pipe line Y valve comprising a casing of rectangular cross section having an inlet opening at its forward end and two spaced outlet openings at its rearward end, a gate fitting within said casing pivotally mounted on a vertical shaft intermediate the forward and rearward edges of the gate to swing the forward edge of the gate across said inlet opening against either side wall of the casing and the rearward edge of the gate from one to the other adjacent edges of the spaced outlet openings, a curved wall extending between said outlet openings against which the rearward end of the gate seals, said gate being of tapering thickness thicker at the position of the shaft and provided with a frame integrally secured to the shaft, and arched side plates removably secured at opposite sides of said frame.

3. A dredge pipe line Y valve comprising a casing of rectangular cross section having an inlet opening at its forward end and two spaced outlet openings at its rearward end, a gate fitting within said casing pivotally mounted on a vertical shaft intermediate the forward and rearward edges of the gate to swing the forward edge of the gate across said inlet opening against either side wall of the casing and the rearward edge of the gate from one to the other adjacent edges of the spaced outlet openings, a curved wall extending between said outlet openings against which the rearward end of the gate seals, and L-shaped soft rubber gasket strips clamped to opposite sides of and along a plurality of margins of said gate sealing same against the casing by internal pressure acting against the gasket.

4. A dredge pipe line Y valve comprising a casing of rectangular cross section having an inlet opening at it forward end and two spaced outlet openings at its rearward end, a gate fitting within said casing pivotally mounted on a vertical shaft intermediate the forward and rearward edges of the gate to swing the forward edge of the gate across said inlet opening against either side wall of the casing and the rearward edge of the gate from one to the other adjacent edges of the spaced outlet openings, a curved wall extending between said outlet openings against which the rearward end of the gate seals, and L-shaped soft rubber gasket strips clamped to opposite sides of and along a plurality of margins of said gate sealing same against the casing by internal pressure acting against the gasket, the leg of the gasket strips clamped to the gate being covered by clamping plates extending over the edge of the strips.

5. A dredge pipe line Y valve comprising a casing of rectangular cross section including flat top and bottom plates and having an inlet opening at its forward end and two spaced outlet openings at its rearward end, a gate fitting within said casing pivotally mounted on a vertical shaft intermediate the forward and rearward edges of the gate to swing the forward edge of the gate across inlet opening against either side wall of the casing and the rearward edge of the gate from one to the other adjacent edges of the spaced outlet openings, and an outwardly flanged curved wall member clamped between the top and bottom plates of the casing forming a sealing plate for the rear edge of the gate in its arcuate path of travel.

6. In the construction specified in claim 5, the top and bottom walls of said casing being flat steel plates, and said curved wall being a separate outwardly flanged unit removably bolted between said plates.

7. In the construction specified in claim 5, the top and bottom walls of said casing being flat steel plates, and said curved wall being a separate outwardly flanged unit clamped between said plates.

8. A dredge pipe line Y valve comprising a casing of rectangular cross section having an inlet opening at its forward end and two spaced outlet openings at its rearward end, a gate fitting within said casing pivotally mounted on a vertical shaft intermediate the forward and rearward edges of the gate to swing the forward edge of the gate across said inlet opening against either side wall of the casing and the rearward edge of the gate from one to the other adjacent edges of the spaced outlet openings, a curved wall extending between said outlet openings against which the rearward end of the gate seals, and the said shaft being closer to the rear edge of the gate than to the forward edge whereby the forward portion of the gate will be over-balanced by internal pressure within the valve casing, a soft rubber gasket strip along opposite side walls of the valve casing against which the forward margin of the gate is adapted to impinge, and a shoulder on the side wall overlying the forward edge of the gate forming a substantially continuous passage surface with the flow diverting side of the gate.

JOHN G. SJOBERG.